US012803777B2

(12) United States Patent
Zhang et al.

(10) Patent No.: US 12,803,777 B2
(45) Date of Patent: Nov. 17, 2026

(54) TIME SYNCHRONIZATION ACROSS DOWNHOLE TOOLS

(71) Applicant: Schlumberger Technology Corporation, Sugar Land, TX (US)

(72) Inventors: Desheng Zhang, Sugar Land, TX (US); Mark Todd Frey, Sugar Land, TX (US); Daniel Jose Fernandez, Houston, TX (US); Robert Tennent, Richmond, TX (US); Mark Kuchenbecker, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 16 days.

(21) Appl. No.: 19/194,492

(22) Filed: Apr. 30, 2025

(65) Prior Publication Data

US 2026/0142793 A1 May 21, 2026

Related U.S. Application Data

(60) Provisional application No. 63/721,062, filed on Nov. 15, 2024.

(51) Int. Cl.
*H04L 7/00* (2006.01)
*E21B 47/12* (2012.01)
(Continued)

(52) U.S. Cl.
CPC ............ *H04L 7/0037* (2013.01); *E21B 47/12* (2013.01); *G06F 1/12* (2013.01); *H04L 7/0008* (2013.01); *H04L 67/12* (2013.01)

(58) Field of Classification Search
CPC ..... H04L 7/0037; H04L 7/0008; H04L 67/12; E21B 47/12; G06F 1/12
See application file for complete search history.

(56) References Cited

U.S. PATENT DOCUMENTS 8,866,633 B2 10/2014 Montgomery
9,182,747 B2 11/2015 Seydoux
(Continued)

OTHER PUBLICATIONS

"Network Time Protocol", downloaded from the internet on Jul. 22, 2025 from [https://en.wikipedia.org/wiki/Network_Time_Protocol], Wikipedia, 11 pages.

*Primary Examiner* — Freshteh N Aghdam
(74) *Attorney, Agent, or Firm* — Jeffrey D. Frantz

(57) ABSTRACT

A method may include sending a first message to an additional processing circuitry, the first message including a first time associated with a transmission of a second message; and sending the second message to the additional processing circuitry. The method may involve determining a second time associated with a reception of a loop-back message and a first loop-back timing delay based on the first and second times. The method may involve receiving a third message from the additional processing circuitry, the third message having a third time associated with a transmission of a fourth message. The method may determine a fourth time associated with a reception of the fourth message, the fourth message including a fifth time. The method may receive a second loop-back timing delay associated with the additional processing circuitry from the additional processing circuitry and determine an absolute time synchronization delay based on the times and delays.

20 Claims, 7 Drawing Sheets

(51) Int. Cl.
*G06F 1/12* (2006.01)
*H04L 67/12* (2022.01)

(56) References Cited

U.S. PATENT DOCUMENTS

| | | | | |
|---|---|---|---|---|
| 10,280,739 | B2 * | 5/2019 | Rodney | H03B 5/02 |
| 10,539,013 | B2 | 1/2020 | Vehra | |
| 10,763,918 | B1 * | 9/2020 | Nowosielski | H04B 3/548 |
| 10,823,870 | B2 | 11/2020 | Kraft | |
| 10,975,688 | B2 | 4/2021 | Krugliak | |
| 11,905,826 | B2 * | 2/2024 | Vehra | E21B 47/12 |
| 2009/0217074 | A1 * | 8/2009 | Nichols | G01V 1/40<br>713/401 |
| 2010/0313646 | A1 * | 12/2010 | Mehta | E21B 47/00<br>73/152.54 |
| 2011/0309948 | A1 * | 12/2011 | Montgomery | G06F 1/12<br>340/853.1 |
| 2014/0266769 | A1 * | 9/2014 | van Zelm | E21B 47/14<br>340/854.3 |
| 2020/0174151 | A1 | 6/2020 | Wu | |
| 2020/0245044 | A1 | 7/2020 | Menssen | |
| 2020/0270987 | A1 | 8/2020 | Krugliak | |
| 2021/0047918 | A1 | 2/2021 | Vehra | |

* cited by examiner

TIME SYNCHRONIZATION ACROSS DOWNHOLE TOOLS

CROSS REFERENCE TO RELATED APPLICATION

The present application claims priority to U.S. Provisional Patent Application No. 63/721,062, titled, "IMPROVING TIME SYNCHRONIZATION ACROSS DOWNHOLE TOOLS," filed on Nov. 15, 2024, which is incorporated herein by reference in its entirety.

BACKGROUND

The present disclosure generally relates to systems and methods for synchronizing downhole drilling tools that have separate clocks. More specifically, the present disclosure provides for improved methodologies for synchronization of downhole tools.

Generally, downhole tools obtain (e.g., generate, acquire) and/or store data associated with formation, wellbore properties, equipment health, and/or any other suitable data associated with subsurface conditions or the downhole tools themselves. The downhole tools may include a central memory to store the data associated with the formation, the wellbore properties, and/or the equipment health. However, it may be difficult to ensure that the datasets acquired from each downhole tool are synchronized with each other given that each tool may refer to its own separate clock. As such, it may be desired to improve time synchronization techniques for downhole tools.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a method may include sending a first message to an additional processing circuitry, the first message including a first time associated with a transmission of a second message from the processing circuitry to the additional processing circuitry and sending the second message to the additional processing circuitry at the first time. The method may involve determining a second time associated with a reception of a loop-back message associated with the second message and a first loop-back timing delay based on the first time and the second time. The method may involve receiving a third message from the second control circuitry, the third message having a third time associated with a transmission of a fourth message from the additional processing circuitry to the processing circuitry. The method may determine a fourth time associated with a reception of the fourth message, the fourth message including a fifth time associated with a transmission of the third message. The method may receive a second loop-back timing delay associated with the additional processing circuitry from the additional processing circuitry and determine an absolute time synchronization delay based on the different times, the first time, the second time, the third time, the fourth time, the fifth time, the first loop-back timing delay, and the second loop-back timing delay.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
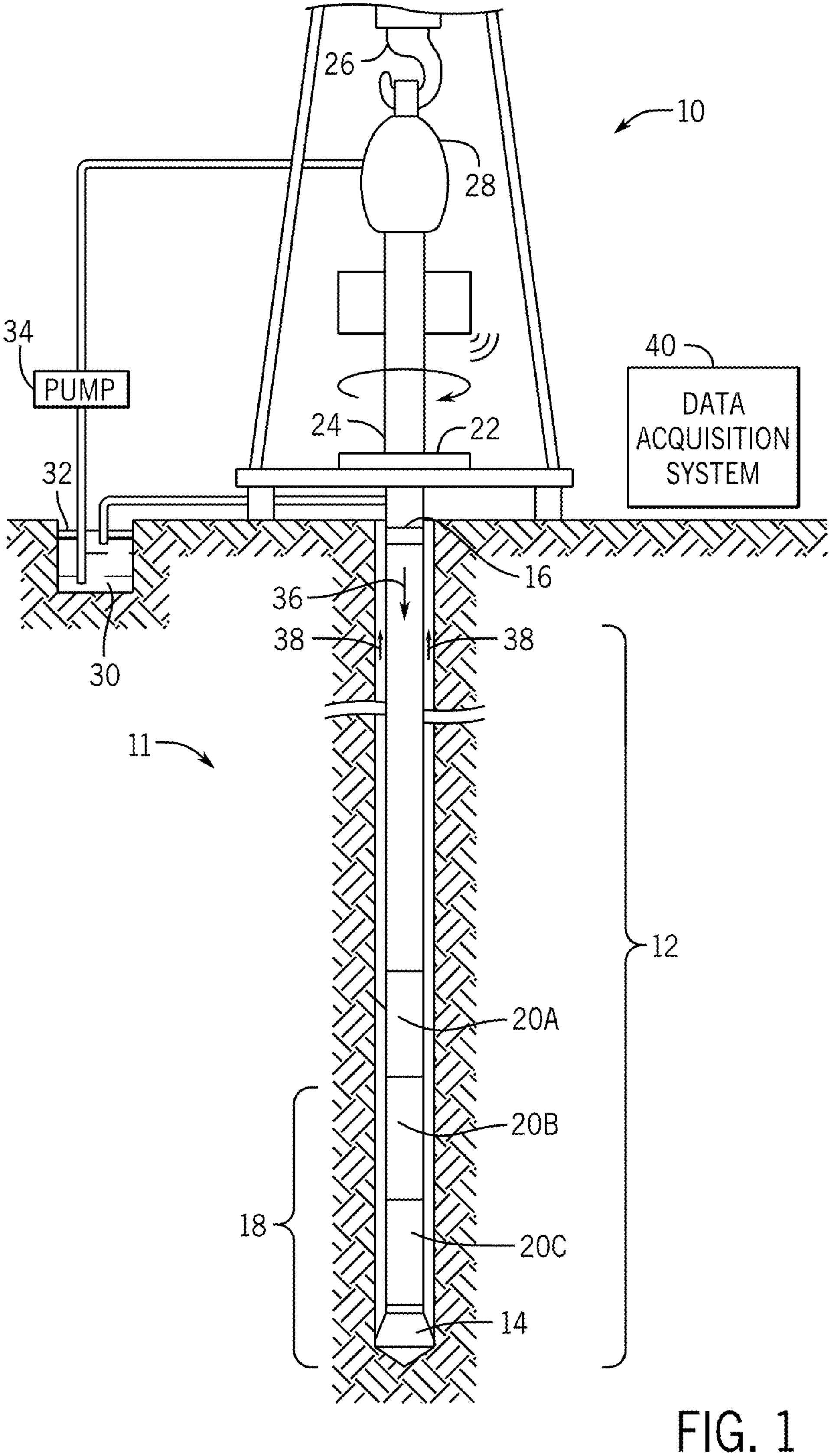
FIG. 1 is a schematic diagram of a drilling system, in accordance with an embodiment of the present disclosure.

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

As used herein, the term "coupled" or "coupled to" may indicate establishing either a direct or indirect connection (e.g., where the connection may not include or include intermediate or intervening components between those coupled), and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

Furthermore, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment," "an embodiment," or "some embodiments" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

Downhole tools may obtain (e.g., generate, acquire) and/or store data associated with formation, wellbore properties, equipment health, and/or any other suitable data associated with subsurface conditions or the downhole tools. The downhole tools may store the data in a single central memory or in multiple memory storage locations. However, the data acquired from different downhole tools may be obtained and synchronized with other downhole tools, a central computing system, a cloud computing system, or the like.

With this in mind, many downhole drilling tools employ separate clocks, and the data acquired from each of them may be processed to ensure that the datasets are accurately synchronized with each other, such that the operations of the respective tools are coordinated to operate properly with each other. For example, performing seismic surveying techniques in a resistivity receiver subsurface area that is particularly sensitive to changes in electrical resistivity may result in inaccurate measurements due to the various time offsets and clock discrepancies associated with a corresponding transmitter subsurface region. As such, the present embodiments include methods to assist with aligning received resistivity measurements with that of a corresponding transmitter's resistivity signal transmission. Further, the present embodiment may also correct the resistivity measurement's phase to be synchronized with other received signals.

To achieve these time synchronization goals, a time synchronization system may determine a time offset and a clock discrepancy of each of the devices that provide data. In some cases, the time synchronization system may employ a leader tool (A) to transmit a synchronization timing signal at a particular clock time according to a leader clock associated with the leader tool. In turn, a follower tool (B) (e.g., dependent on the leader tool) may acquire and determine a signal reception time according to with its local or follower clock time. The time synchronization system may then determine a time offset due to the clock discrepancies between each clock by comparing a difference between the timing signal's leader transmission time and the follower's reception time. That is, the clock discrepancy can be obtained by measuring the elapsed time differences of the timing signal sent by leader and the receptions of the timing signals, which may be provided as synchronization events.

The device synchronization scheme mentioned above assumes that the times at which leader tool transmits the timing signal, and the follower tool receives the timing signal are the same or occurs simultaneously. However, this scheme ignores a latency timing delay associated with the delay between the timing signal being transmitted from the leader tool and being received by the follower tool. Although certain applications may be able to tolerate this timing delay when the timing delay is less than some threshold or remains constant for various transmissions, other applications may produce incorrect analytical results due to the unaccounted latency timing delay being considered or accurately measured and compensated for in the synchronization measurements. Moreover, in some embodiments, the timing signal sent by the leader tool may be a tone signal that may be correlated with a reference signal at an integer multiple of its signal period. As a result, the follower tool may receive the timing signal at a phase shift (e.g., phase-banding issue) that may occur due to the differences between the phases of the tone signal and the reference signal, noise embedded in the tone signal, and the like. As such, the time synchronization system may benefit from performing synchronization techniques that ensure that time is synchronized for various devices in an absolute time manner.

Keeping this in mind, in some embodiments, the time synchronization system may execute an absolute time synchronization technique by measuring a timing signal dispatch delay from one tool's transmission (e.g., leader tool) to the other tool's reception (e.g., follower tool) using a round-trip inter-tool communication and timing signal burst.

The time offset between the two tools may then be used to synchronize the times that each tool records events and datasets to ensure that other applications may accurately perform their analytic operations accordingly. Moreover, by ensuring that the times recorded by separate devices are accurately synchronized with each other, the present embodiments better equip various processing and computing devices to perform more accurately accounting for different system and equipment delays. Additional details with regard the embodiments described above will be discussed below.

By way of introduction, FIG. 1 is a schematic diagram of a drilling system 10, in accordance with an embodiment of the present disclosure. The drilling system 10 may include a downhole system 11. The downhole system 11 may include a drill string 12 and a drill bit assembly 14. The drill string 12 may be suspended within a borehole 16, which is formed within subsurface formations through a process of rotary drilling (e.g., advancing the drill bit assembly 14 into a surface). Moreover, the drill string 12 may include a downhole assembly 18 (e.g., bottom hole assembly), which includes the drill bit assembly 14 at a lower end (e.g., bottom end) of the downhole assembly 18. The downhole assembly 18 may include one or more downhole tools 20 (e.g., a first tool 20A, a second tool 20B, a third tool 20C). It should be noted that while FIG. 1 depicts a vertical well, present embodiments may be employed in any other suitable environment, such as a horizontal well. It should also be noted that while the first tool 20A, the second tool 20B, and the third tool 20C are described herein, the downhole assembly 18 may include any number of suitable downhole tools.

By way of example, the first tool 20A, the second tool 20B, and the third tool 20C may each include respective tool control circuitry. Each of the tool control circuitry may employ a communication technology (e.g., Ethernet) to enable communication between the first tool 20A, the second tool 20B, the third tool 20C, and/or a data acquisition system 40. For example, the first tool 20A may initiate a communication process (via respective tool control circuitry) with the second tool 20B by sending a number of data packets to the second tool 20B using a communication stack. Moreover, the first tool 20A and the second tool 20B may communicate via network layer protocols that provide unique identifiers (e.g., Internet Protocol (IP) addresses) in Ethernet packet headers, such as Internet Protocol version 4 (IPv4), Internet Protocol version 6 (IPv6). As another example, the first tool 20A and the second tool 20B may communicate using Transmission Control Protocol (TCP) to enable the number of data packets to be sent in a particular order (e.g., without loss or duplication). The second tool 20B may then receive the number of data packets (via the respective tool control circuitry).

In some embodiments, the Ethernet networking may operate based on various standards set by the Institute of Electrical and Electronics Engineers (IEEE). As an example, the Ethernet technology may employ the IEEE 802.3 standard, which defines protocols and/or specifications for physical and/or data link layers of a network to manage how devices share a communication medium (e.g., twisted pair cable, coaxial cable, fiber optic cable). As another example, the Ethernet technology may communicate via a Carrier Sense Multiple Access with Collision Detection (CSMA/CD) MAC protocol, which includes half duplex (e.g., shared medium) operation or full duplex operation. In addition, the Ethernet networking operations performed between the downhole tools 20 may involve using Ethernet technology to create local area networks (LANs) or wide area networks (WANs) between the downhole tools 20 via practices, protocols, and hardware used to establish communication between devices within a network using Ethernet technology.

The first tool 20A, the second tool 20B, and the third tool 20C may include any suitable tool for performing hydrocarbon exploration and production operations. For instance, the tools 20 may include drilling tools that may cut through rock formations, completion tools that may be used to provide structural integrity (e.g., casing, tubing, packers) to a wellbore, intervention tools (e.g., wireline tools, coiled tubing tools) to perform certain wireline operations (e.g., logging, perforating), production enhancement tools (e.g., downhole sensors), and the like. Each of the tools 20 may perform certain tasks related to collecting data or performing physical operations within the borehole.

At a surface, the drilling system 10 may include a platform and derrick assembly, which may be positioned over the borehole 16. Further, the downhole system may include a rotary table 22, a kelly 24, a hook 26, and/or a rotary swivel 28. The drill string 12 may be rotated via the rotary table 22 (e.g., energized by any suitable means), which may engage the kelly 24 at an upper end of the drill string 12. Further, the drill string 12 may be suspended by the hook 26, which may be attached to a traveling block via the kelly 24 and the rotary swivel 28. The kelly 24 and the rotary swivel may enable rotation of the drill string 12 relative to the hook 26.

The drilling system 10 may also include drilling fluid 30 (e.g., mud) stored in a pit 32 formed at a well site. A pump 34 may deliver the drilling fluid 30 to an interior of the drill string 12 via one or more ports of the rotary swivel 28. Thus, the drilling fluid may flow downwardly through the drill string 12 (e.g., as indicated by a directional arrow 36). The drilling fluid 30 may exit the drill string 12 via one or more ports of the drill bit assembly 14 and circulate upwardly through an annulus region between an outside of the drill string 12 and a wall of the borehole 16 (e.g., as indicated by directional arrows 38). The drilling fluid 30 may lubricate the drill bit assembly 14 and carry formation cuttings up to the surface as it is returned to the pit 32 for recirculation.

In some embodiments, the downhole assembly 18 may include a measuring while drilling (MWD) module, a logging-while-drilling (LWD) module, and/or a roto-steerable system and motor. The LWD module may be housed in a drill collar of the drill string 12 and include one or more logging tools, such as resistivity tools, density tools, acoustic tools, or any other suitable logging tool. Thus, the LWD module may measure, process, and/or store data obtained by the one or more logging tools and/or communicate (e.g., transmit) the data to any suitable surface equipment.

The MWD module may also be housed in the drill collar of the drill string 12 and include one or more devices for measuring characteristics (e.g., downhole parameters) of the drill string 12 and/or the drill bit assembly 14. In some embodiments, at least one of the downhole tools 20 may be the MWD module. Additionally, in some embodiments, the MWD module may include a device for generating electrical power for the drilling system 10. For example, the device for generating electrical power may be a mud turbine generator powered by the flow of the drilling fluid 30. It should be noted that any other suitable device for generating electrical power may be used for the drilling system 10. Moreover, the MWD module may include one or more measuring devices, such as a weight-on-bit measuring device, a shock measuring device, a stick slip measuring device, a direction measuring device, an inclination measuring device, and/or the like.

The drill bit assembly 14 may include a rotary steerable sub (RSS) (e.g., a PowerDrive system). The RSS sub may include a chassis (e.g., pressure housing, pressure barrel, cavity, casing), which may include one or more electrical components mounted to and/or included within the chassis. The electrical components may include Ethernet devices (e.g., Ethernet technology), a reservoir formation measurement component, electromagnetic (EM) transceiver equipment, one or more sensors, and the like. The chassis may provide a stiffness to protect the electrical components from downhole environmental conditions, such as shock and/or vibration. Additionally or alternatively, the chassis may serve as a heat sink to draw heat from thermally active electronic components. The electrical components may be connected to one or another via interconnections (e.g., printed electrical connections) that may enable the electrical components to transfer electrical signals and/or electrical power between respective electrical components. It should be noted that any suitable number of electrical components may be employed by the chassis. The LWD module, the MWD module, and/or the electrical components may obtain data from and/or communicate data to a data acquisition system 40.

Figure 2:
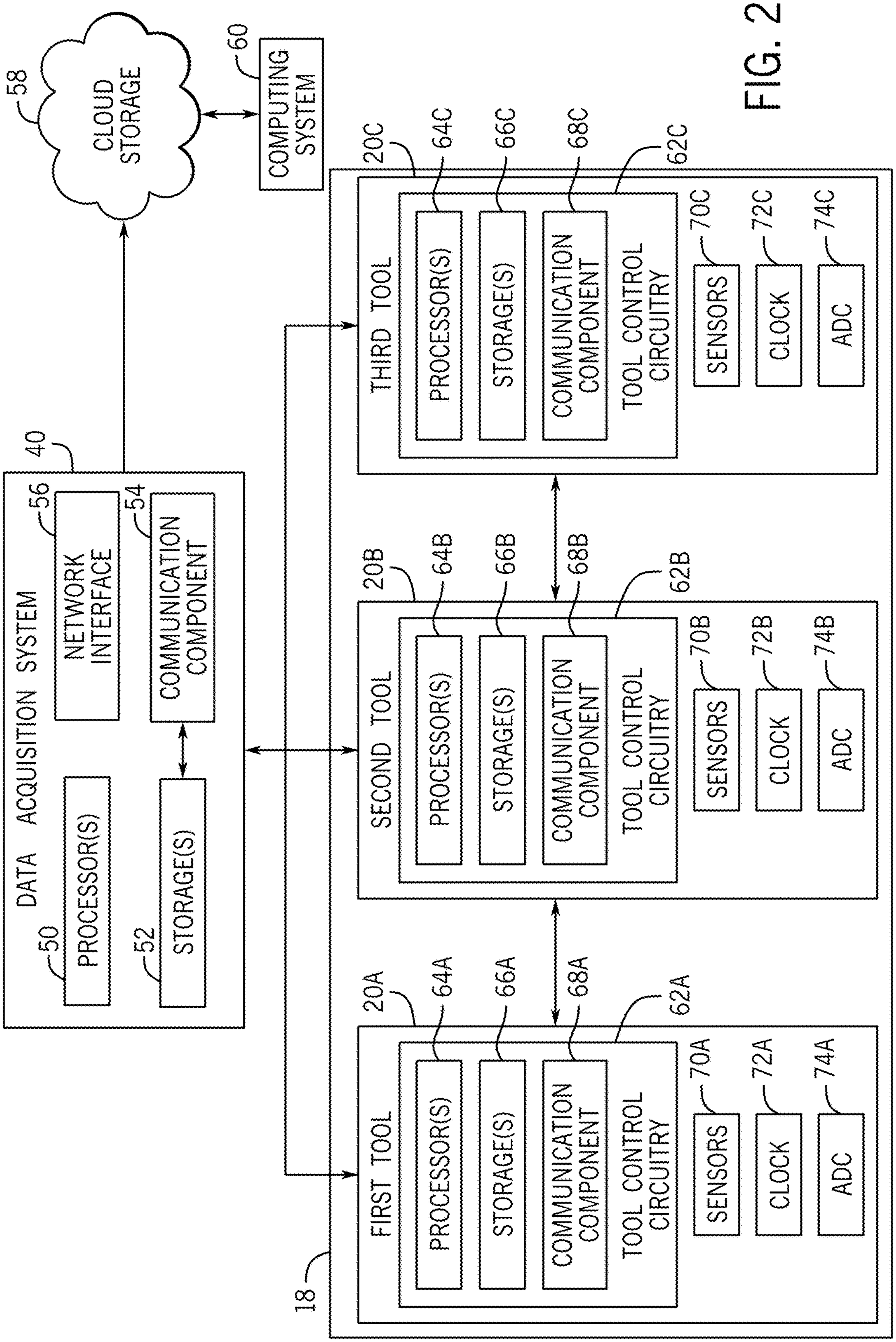
FIG. 2 is a block diagram of a data acquisition system in communication with a plurality of tools, in accordance with an embodiment of the present disclosure.

FIG. 2 is a block diagram of the drilling system 10 of FIG. 1 including the data acquisition system 40, in accordance with an embodiment of the present disclosure. The data acquisition system 40 may include one or more processors 50 (referred to herein, in a singular form, as a "processor 50" for convenience), one or more storages 52 (referred to herein, in a singular form, as a "storage 52" for convenience), a communication component 54 (e.g., communication circuitry), and/or a network interface 56. The processor 50 may be any type of computer processor or microprocessor capable of executing computer-executable code, such as a microcontroller, a processor module or subsystem, a programmable integrated circuit, a programmable gate array, a digital signal processor (DSP). The processor 50 may also include multiple processors, processing circuitry, or a processing system that may perform the operations described herein.

The storage 52 (e.g., storage media, memory) may be implemented as one or more non-transitory computer-readable or machine-readable storage media. In certain embodiments, the storage 52 may include a volatile memory, such as random-access memory (RAM), and/or a nonvolatile memory (ROM). The storage may store a variety of information and may be used for various purposes. For example, the storage 52 may store processor-executable instructions, such as instructions for controlling the downhole tools 20 of the drill string 12 and/or any other suitable component associated with the drilling system 10. The storage 52 may also include flash memory, or any suitable optical, magnetic, or solid-state storage medium, or a combination thereof. The storage 52 may store data, instructions (e.g., software or firmware), and any other suitable information. In certain embodiments, the storage 52 may be located either in the machine running the machine-readable instructions, or may be located at a remote site from which machine-readable instructions may be downloaded over a network for execution.

The communication component 54 may include a wired or wireless communication component that facilitates communication between the downhole tools 20, the data acquisition system 40, cloud storage 58, an external computing system 60, and/or various other computing systems. It should be noted that, the communication component 54 may be a communication bus that enables communication access to multiple devices within the drilling system 10 after the drilling system 10 is extracted from the borehole. For example, the communication bus may enable any suitable device within the drilling system 10 to communicate with one or more of the downhole tools 20. In some embodiments, the communication component 54 may include a Power over Ethernet (PoE) switch (e.g., a network switch) that may provide data connection and/or power supply to any suitable device with Ethernet connectivity. The PoE switch may include one or more ports (e.g., Ethernet ports), where some ports may be capable of delivering power, while other ports may function for data transmission.

Additionally or alternatively, the communication component 54 may include antennas, transceiver circuits, signal processing hardware, software (e.g., hardware or software filters, A/D converters, multiplexers, or amplifiers), or a combination thereof, that may be configured to communicate over wired and/or wireless communication paths (e.g., a hardwired network, Infrared (IR) wireless communication, satellite communication, broadcast radio, Microwave radio, Bluetooth, Zigbee, Wi-fi, UHF, NFC). In some embodiments, the communication component 54 may include mud pulse telemetry to modulate a signal through pressure waves in a mud line. In other embodiments, the communication component 54 may transmit electromagnetic waves through a surface. In yet another embodiment, the communication component 54 may include wired drill pipes, which may include an embedded wire to provide an electrical connection across the drilling system 10.

In some embodiments, the data acquisition system 40 may include the network interface 56, which may enable the data acquisition system 40 to communicate with various downhole components and/or surface equipment of the drilling system 10 as discussed above. Additionally or alternatively, the network interface 56 may enable the data acquisition system 40 to communicate data to the cloud storage 58 (or other wired and/or wireless communication network) to, for example, store the data, archive the data, and/or enable the external computing system 60 to access the data and/or to remotely interact with the data acquisition system 40.

As described herein, the first tool 20A, the second tool 20B, and/or the third tool 20C of the drill string 12 may communicate with each other via tool control circuitry 62A, tool control circuitry 62B, and/or tool control circuitry 62C using Ethernet networking protocols while in the borehole. The first tool 20A may include tool control circuitry 62A that includes one or more processors 64A (referred to herein, in a singular form, as a "processor 64A" for convenience), one or more storages 66A (referred to herein, in a singular form, as a "storage 66A" for convenience), and/or a communication component 68A. The processor 64A may be similar to and/or the same as the processor 50. The storage 66A may be the same as and/or similar to the storage 52. The communication component 68A may be the same as or similar to the communication component 54. Indeed, the communication component 68A may employ Ethernet communication. In some embodiments, the tool control circuitry 62A may be included within the chassis, enabling the tool control circuitry 62A (e.g., the processor 64A, the storage 66A, and/or the communication component 68A) to be shielded from environmental conditions (e.g., environmental factors), such as temperature, pressure, vibration, shock, electricity, and the like. In this manner, the chassis may provide protection for the tool control circuitry 62A from the environmental conditions.

The first tool 20A may also include one or more sensors 70A (e.g., downhole sensors) communicatively coupled to the tool control circuitry 62A. The sensors 70A may include any suitable sensor capable of gathering data associated with subsurface conditions and/or well performance of the drilling system 10. Further, the sensors 70A may be designed to withstand any suitable environment, such as a high temperature environment, an extreme pressure environment, and the like. As an example, the sensors 70A may include pressure sensors, temperature sensors, flow sensors, acoustic sensors, density and composition sensors, strain and stress sensors, and the like. The sensors 70A may gather the data to enable operators to monitor and/or control downhole conditions in real-time, improve production processes, and/or make informed decisions to increase reservoir recovery.

The sensors 70A may provide the data to the tool control circuitry 62A to store in the storage 66A. For example, the storage 66A may include a local memory to store the data gathered by the sensors 70A. Moreover, the data may be transmitted, via the communication component 68A, either to the second tool 20B, the third tool 20C, and/or the data acquisition system 40 (e.g., when the tools 20 are present at the surface) for storage elsewhere or for transmission to other devices. For example, the tool control circuitry 62A may be instructed (e.g., by the data acquisition system 40) to transmit the acquired data to the second tool 20B in response to detecting damage to the storage 66A (e.g., corrupted storage, within threshold of capacity). In some embodiments, the tool control circuitry 62A may transmit data acquired via the sensors 70A directly to the second tool 20B, and/or the third tool 20C via the network. In some embodiments, if the storage 66A of the first tool 20A is full, the tool control circuitry 62A may transmit the data to the second tool 20B, and/or the third tool 20C in real time. It should be noted that the tool control circuitry 62B of the second tool 20B and the tool control circuitry 62C of the third tool 20C may operate similar to and/or the same as the tool control circuitry 62A of the first tool 20A.

In the same manner as described above, the second tool 20B and the third tool 20C may include the tool control circuitry 62B/62C that includes one or more processors 64B/64C (referred to herein, in a singular form, as a "processor 64B/64C" for convenience), one or more storages 66B/66C (referred to herein, in a singular form, as a "storage 66B/66C" for convenience), a communication component 68B/68C, and/or one or more sensors 70B/70C. The processor 64B and the processor 64C may be similar to and/or the same as the processor 64A. The storage 66B and the storage 66C may be the same as and/or similar to the storage 66A. The communication component 68B and the communication component 68C may be the same as or similar to the communication component 68A. Moreover, the sensors 70B and the sensors 70C may be similar to and/or the same as the sensors 70A.

Therefore, each of the respective tool control circuitry 62 (e.g., 62A, 62B, and/or 62C) may acquire (e.g., receive) the data associated with the subsurface conditions and/or the well performance from their respective sensors 70 (e.g., 70A, 70B, and/or 70C). Further, each of the respective tool control circuitry 62 may communicate the data either to a separate tool control circuitry 62 (e.g., other tool control circuitry 62) (e.g., and/or the data acquisition system 40 when extracted). Each of the respective tool control circuitry 62 may be connected via a network (e.g., wired or wirelessly) to each other while positioned. In this manner, the data acquisition system 40 may acquire data from each of the respective tool control circuitry 62 either simultaneously or at separate times.

In addition to the sensors 70, each tool 20A may include a reference clock 72 that may be used to measure time stamps or time samples corresponding to data acquired via the sensors 70, received from other devices (e.g., different tools 20), and the like. As mentioned above, each of the clocks 72 may not be synchronized with each other. As such, the data acquisition system 40 or other suitable device may coordinate time synchronization operations to determine the time discrepancies between the respective clocks 72.

In some embodiments, the tool control circuitry 62 may also include an analog-to-digital converter (ADC) device 74. The ADC device 74 may include an electronic component or circuit that may covert analog signals (e.g., modulated, burst, continuous) into digital signals that may be interpreted by computing devices. The ADC device 74 may sample received signals in accordance with the respective clocks 72 to indicate time stamps associated with different parts of the respective signal.

Figure 3:
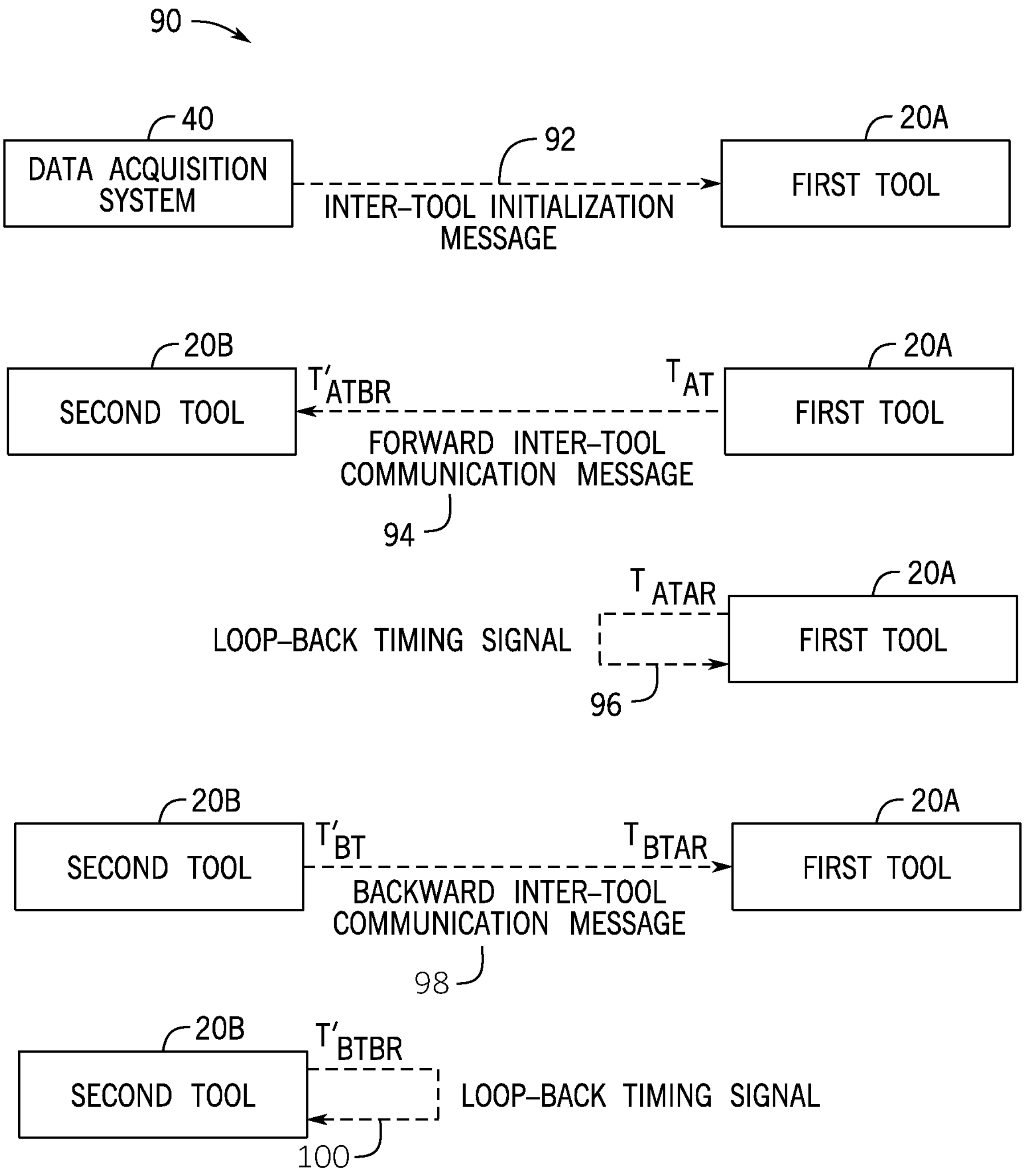
FIG. 3 is a communication flow diagram between tools coordinating synchronization operations, in accordance with an embodiment of the present disclosure.

Keeping the foregoing in mind, FIG. 3 illustrates a timing flow chart of a method 90 for performing time synchronization techniques between two devices. By way of example, a procedure for executing one round-trip inter-tool communication and timing burst transmission/reception cycle between two different tools is described below. Although the following description of the method 90 will be discussed as being performed by the data acquisition system 40, the first tool 20A, and the second tool 20B, it should be noted that the embodiments described herein should not be limited to the environment and components presented in FIGS. 1 and 2. Indeed, the time synchronization techniques described below may be performed using any suitable computing system to synchronize time values between any two suitable devices operating with respective clocks. However, for the sake of discussion, the following description of the method 90 will be detailed as being performed by the data acquisition system 40, the first tool 20A, and the second tool 20B.

Referring now to FIG. 3, the data acquisition system 40 may periodically initiate a time synchronization operation as described herein or may be prompted to perform the time synchronization operation in response to receiving a user input requesting the operation. In some embodiments, the request to synchronize two or more tools 20 may include an indication of the tools 20 that are to be synchronized.

In any case, the method 90 describes an example embodiment in which two tools are synchronized in accordance with the techniques described herein. As such, in response to receiving a request for synchronizing the first tool 20A and the second tool 20B, the data acquisition system 40 may send (92) a message (e.g., inter-tool initialization message) to the first tool 20A, which may function as the leader tool to coordinate the time synchronization techniques. In some embodiments, the inter-tool initialization message may authorize the first tool 20A to use a particular communication bus (e.g., tool bus) that is available between the two tools being synchronized.

After receiving the inter-tool initialization message, the first tool 20A may send (94) a forward inter-tool communication message that may include a pre-determined time $T_{At}$ (e.g., time according to first tool clock 74A). The pre-determined time $T_{At}$ may correspond to a time at which the forward synchronization timing signal (e.g., timing signal) will be transmitted to the second tool 20B. In some embodiments, in addition to determining the time $T_{At}$, the first tool 20A may determine a time to turn on the ADC device 74A to capture or sample a loop-back timing signal that the first tool 20A may send to an internal component, which may then immediately return it to the component of the first tool 20A that transmitted the loop-back timing signal.

The loop-back timing signal may be a signal that is used to determine the internal latency for communications between internal components. That is, for example, when the first tool 20A generates a timing signal burst, the same tool may also capture and demodulate for the reception time of the timing signal it is generated after it is returned by an internal hardware component. This loopback timing signal measurement is used to compensate for the internal hardware transmission and reception delays of the first tool 20A so that the overall delay can be accurately measured.

After receiving the forward inter-tool communication message from the first tool 20A, the second tool 20B may determine a time to turn on the ADC device 74B of the second tool 20B to capture or sample the forward inter-tool communication message received from the first tool 20A. As such, the forward inter-tool communication message may serve as an initialization message for the second tool 20B to initialize the additional ADC device to capture a subsequent timing signal sent from the first tool 20A.

Referring back to the first tool 20A, at the pre-determined time $T_{At}$, the first tool 20A may transmit the forward synchronization timing signal to the second tool 20B via the communication bus. In some embodiments, the forward inter-tool communication message may include a timing signal (e.g., desired data, tone burst, burst signal, timing burst) that may be embedded into a modulated carrier wave. The timing signal may include a signal, such as a sine wave, having some duration and amplitude. The resulting timing signal may correspond to the forward synchronization timing signal. The transmission of the forward synchronization timing signal by the first tool 20A and the reception of the forward synchronization timing signal by the second tool 20B may then be captured by the respective ADC devices 74 of the first tool 20A and the second tool 20B.

After detecting the forward synchronization timing signal using their respective ADC devices 74, the first tool 20A and the second tool 20B may demodulate the forward synchronization timing signal to determine a signal reception time according to each respective tool's time reference (e.g., respective clock 72). As such, the first tool 20A may indicate that the forward synchronization timing signal is transmitted at time $T_{At}$ and the second tool 20B may detect the reception of forward synchronization timing signal at time $T'_{AtBr}$. The second tool 20B may then generate its clock discrepancy measurement with respect to the first tool 20A according to Equations 1-3.

$$K_{ppb} = \left(1 - (f_R/f_T)\right)\cdot 10^9 = \left(1 - \frac{\Delta SYNC_R}{\Delta SYNC_T}\right)\cdot 10^9 \quad (1)$$

where "SYN" "C"_R = "SYN" "C"_R − "SYN" "C"_(R − 1) (2)

"SYN" "C"_T = "SYN" "C"_T − "SYN" "C"_(T − 1) (3)

After demodulating the forward synchronization timing signal, the first tool 20A may calculate a loop-back timing signal delay $D_{Al}$, which may correspond to a delay in time between the predetermined time $T_{At}$ that the first tool 20A may transmit the forward synchronization timing signal and a time $T_{AtAr}$ that the forward synchronization timing signal is received after it looped back to the component of the first tool 20A that originated or transmitted the forward synchronization timing signal (e.g., $D_{Al}=T_{AtAr}-T_{At}$). That is, the first tool 20A (A) may send the forward synchronization timing signal (96) to an internal component of the first tool 20A, such that the internal component may send the same forward synchronization timing signal back to the originator of the forward synchronization timing signal from within the same first tool 20A.

Referring now back to the second tool 20B, after receiving and demodulating the forward synchronization timing signal, the second tool 20B may send (98) a backward inter-tool initialization message to the first tool 20A, such that the backward inter-tool initialization message may include synchronization measurements, as measured by the ADC device 74B of the second tool 20B. For example, the second tool 20B may detect a time $T'_{AtBr}$ at which the second tool 20B received the forward synchronization timing signal from the first tool 20A, a previously measured loop-back delay $D_{Bl}$ for the second tool 20B, a backward synchronization timing signal transmission time $T'_{Bt}$, and the like. Like the first tool 20A, after sending backward inter-tool initialization message to the first tool 20A, the second tool 20B may determine a time to turn on the respective ADC device 74B for sampling the loop-backward timing signal (100) corresponding to the backward synchronization timing signal that the second tool 20B generated.

After receiving the backward inter-tool initialization message from the second tool 20B, the first tool 20A may determine a time $T'_{Bt}$ to turn on its respective ADC device 74A to capture the backward synchronization timing signal received from the second tool 20B. At the pre-determined time $T'_{Bt}$, second tool 20B may transmit the backward synchronization timing signal to the first tool 20A via the communication bus. In turn, the transmission and the reception of the backward synchronization timing signal may be captured by the second tool 20B and the first tool 20A, respectively.

After receiving the backward synchronization timing signal and the loop-backward timing signal, the first tool 20A and the second tool 20B may demodulate the backward synchronization timing signal to determine a respective signal reception time according to each respective clock 72. As such, the loop-backward timing signal may be received at the second tool 20B at time $T'_{BtBr}$, and the backward synchronization timing signal may be received at the first tool 20A at time $T_{BtAr}$. The first tool 20A may then generate its clock discrepancy measurement with respect to the second tool 20B using the method shown above with respect to Equations 1-3.

After demodulating the loop-back timing signal, the second tool 20B may calculate its loop-back timing signal delay $D_{Bl}$ based on a difference between the time $T'_{BtBr}$ that the loop-backward timing signal was received at the second tool 20B and the time $T'_{Bt}$ that the second tool 20B transmitted the backward synchronization timing signal to the first tool 20A ($D_{Bl}=T'_{BtBr}-T'_{Bt}$). The second tool 20B may send the measurement of the loop-back timing signal delay $D_{Bl}$ to the first tool 20A in a subsequent synchronization cycle. After receiving the measurements from the second tool 20B, the first tool 20A may calculate an absolute time synchronization timing signal dispatch delay $D_{BtAr}$, which may correspond to a time offset with the second tool 20B.

Accordingly, the absolute time synchronization timing signal dispatch delay $D_{BtAr}$ may be used by other applications or devices to synchronize the measurements or datasets acquired by different tools or devices. It should be noted that if a user may wish to know the offset time of the second tool 20B with the first tool 20A, then the first tool 20A may include its previous synchronization measurements, such as $T_{BtAr}$ and $D_{Al}$, in its inter-tool communication message sent to the second tool 20B discussed above.

In some embodiments, the data acquisition system 40 may coordinate the transmission of messages as described above to determine the absolute time synchronization timing signal dispatch delay $D_{BtAr}$ and other delays as will be detailed below. Using these delays, the data acquisition system 40 may synchronize the datasets and time data received from the tools 20 to ensure that they are in sync with each other to perform various operations. That is, the data acquisition system 40 may synchronize the datasets received from each tool 20 to determine operational adjustments (e.g., increase speed, adjust frequency) for the tools 20. In some embodiments, the tool control circuitry 62 may perform the embodiments described herein to synchronize its operations with another tool in the drill string 12. Although the foregoing description of the synchronization operations is described with respect to tools 20 of the drill string 12, it should be understood that the methods and techniques described herein may be applied to any suitable clock synchronization operations.

With the foregoing in mind, the timing signal dispatch delay from one tool to another can be divided into three types of delays. First, an internal transmission delay of the signal generating tool may include a delay from the time the originating device starts the transmission to the time that the signal appears on the communication bus. For example, the transmission buffering delay is included in the transmission delay.

The second type of delay may include a channel delay or the communication bus traveling delay from one tool to another. The third type of delay may include an internal reception delay of the signal reception tool. That is, the delay from the time that the signal arrives at the tool to the time that the signal is received. For example, the reception buffering delay, as well as hardware analog and digital filtering delays, are included in the reception delay.

Figure 4:
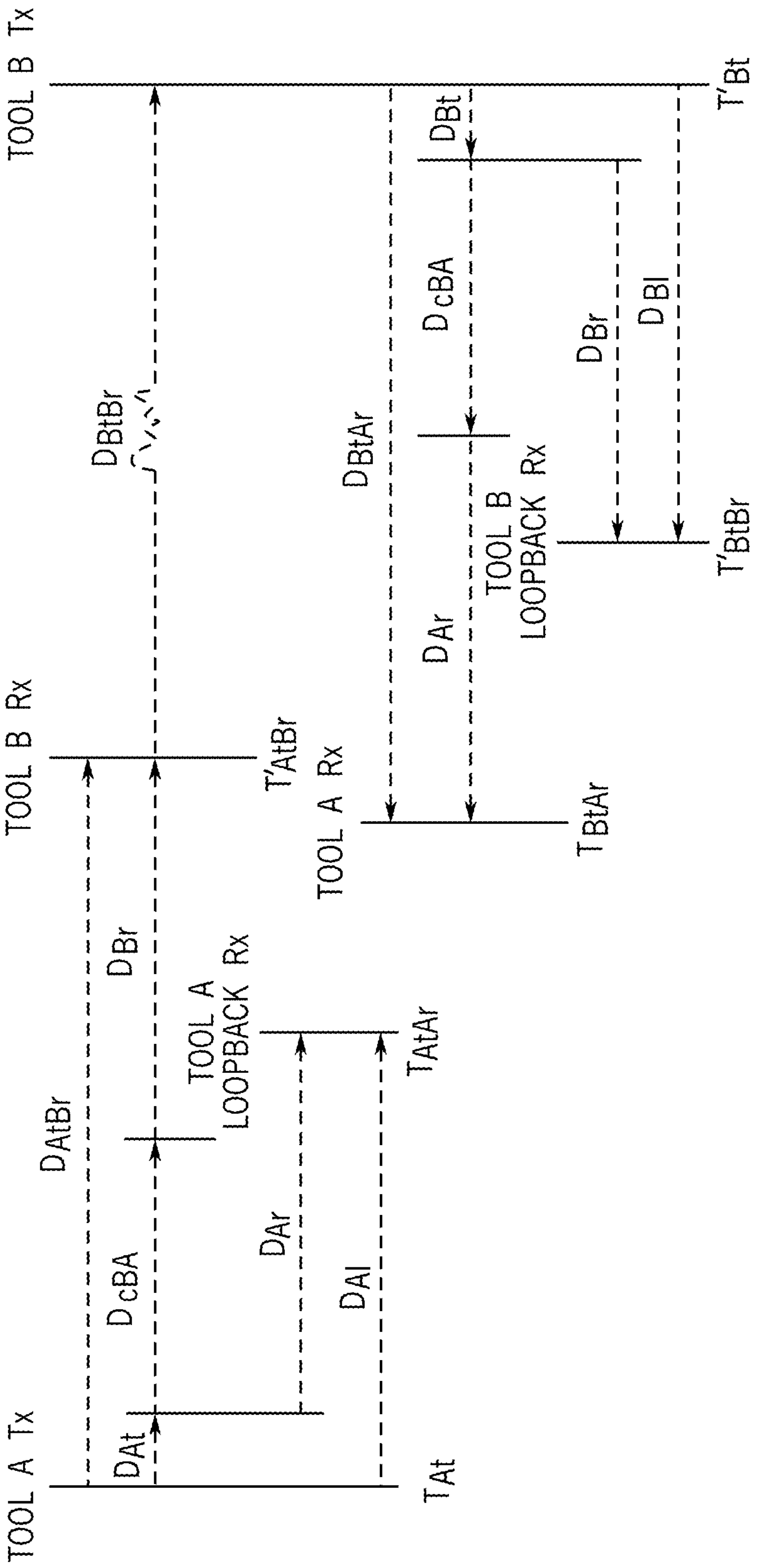
FIG. 4 is a time and delay diagram illustrating calculated times and delays associated with synchronizing times between two tools, in accordance with an embodiment of the present disclosure.

With the foregoing in mind, FIG. 4 illustrates a timing diagram depicting the various time delays that may be involved with the method 90. Using the clock time of the first clock 72A of the first tool 20A as reference, the time $T_{BtAr}$ that the backward synchronization timing signal is received may be characterized as:

$$T_{BtAr} = T_{At} + D_{AtBr} + D_{BrBt} + D_{BtAr} \text{ with} \quad (4)$$

$$D_{AtBr} = D_{At} + D_{cAB} + D_{Br} \quad (5)$$

$$D_{BrBt} = T'_{Bt} - T'_{AtBr} \quad (6)$$

$$D_{BtAr} = D_{Bt} + D_{cBA} + D_{Ar} \quad (7)$$

where:

$T_{BtAr}$ is timing signal receiving time at the first tool 20A after it is transmitted from the second tool 20B (in the clock 72A time reference);

$T_{At}$ is timing signal transmission time (in the clock 72A time reference);

$D_{AtBr}$ is the time delay from the timing signal transmission of the first tool 20A to the reception of the second tool 20B;

$D_{BrBt}$ is the time delay for timing signal transmitted from the first tool 20A and received at the second tool 20B to timing signal transmission from the second tool 20B;

$D_{BtAr}$ is the time delay between the timing signal transmission from second tool 20B to the reception by the first tool 20A;

$D_{At}$ is the transmission delay of the first tool 20A;

$D_{cAB}$ is the channel time delay from the first tool 20A to the second tool 20B;

$D_{Br}$ is the reception delay of the second tool 20B;

$T'_{Bt}$ is the timing signal transmission time from the time reference of the clock 72B;

$T'_{AtBr}$ is the time that the timing signal is received at the second tool 20B after being transmitted from first tool 20A (in the time reference of the clock 72B);

$D_{Bt}$ is the transmission delay of the second tool 20B;

$D_{cBA}$ is the channel time delay from the second tool 20B to the first tool 20A; and $D_{Ar}$ is the reception delay of the first tool 20A.

Assuming that:

$$D_{cAB} = D_{cBA} = D_c \text{ Then,} \quad (8)$$

$$\begin{aligned} T_{BtAr} = T_{At} + D_{At} + D_c + D_{Br} + D_{BrBt} + D_{Bt} + D_c + D_{Ar} = \quad (9) \\ T_{At} + D_{At} + D_{Ar} + D_{Bt} + D_{Br} + D_{BrBt} + 2D_c = \\ T_{At} + D_{Al} + D_{Bl} + D_{BrBt} + 2D_c \end{aligned}$$

Where, $D_{Al}=D_{At}+D_{Ar}$ can be obtained by subtracting the timing signal firing time of the first tool 20A by its loopback signal receiving time.

$$D_{Al} = D_{At} + D_{Ar} = T_{AtAr} - T_{At} \quad (10)$$

With $T_{AtAr}$ being the loopback timing signal receiving time of the first tool 20A (in the time reference of the first clock 72A).

$D_{Bl}=D_{Bt}+D_{Br}$ can be obtained by subtracting the timing signal firing time of the second tool 20B by its loopback signal receiving time.

$$D_{Bl} = D_{Bt} + D_{Br} = T'_{BtBr} - T'_{Bt} \quad (11)$$

With $T'_{BtBr}$ being the loopback timing signal receiving time of the second tool 20B (in the time reference of the second clock 72B).

From Eq. (9) to Eq. (11), an expression for $D_c$ includes:

$$\frac{[D_c = (T]_{BtAr} - T_{At} - D_{Al} - D_{Bl} - D_{BrBt})}{2} \quad (12)$$

$$= \frac{[[T]_{BtAr} - T_{AtAr}) - [(T']_{BtBr} - (T')_{AtBr})]}{2} \quad (13)$$

Further assuming that $$D_{At} = D_{Bt} = D_t \quad (14)$$

Eq. (5) then becomes $$D_{AtBr} = D_{Bt} + D_{Br} + D_c = D_{Bl} + D_c \quad (15)$$

Similarly, Eq. (7) becomes $$D_{BtAr} = D_{At} + D_{Ar} + D_c = D_{Al} + D_c \quad (16)$$

The time offset between the first tool 20A and the second tool 20B may be obtained as:

$$O_{AB} = (T'_{AtBr} - D_{AtBr}) - T_{At} = T'_{Bt} - (T_{BtAr} - D_{BtAr}) \quad (17)$$

The relation of the first tool 20A and the second tool 20B system times can therefore be given by $$t'_B = t_A + O_{AB} \text{ or} \quad (18)$$

$$t_A = t'_B - O_{AB} \quad (19)$$

With equations (18) and (19), any system time $t_A$ in the time reference of the first clock 72A is equivalent to $t_A+O_{AB}$ in the time reference of the second clock 72B, and any system time $t'_B$ in the time reference of the second clock 72B is equivalent to $t'_B-O_{AB}$ in the time reference of the first clock 72A.

In some embodiments, the first clock 72A and the second clock 72B are assumed to have exactly the same frequency. However, since different clock crystals may have frequencies that varies with environment, the data acquisition system 40 may normalize any received times with the second clock 72B reference with respect to the first clock 72A reference. Therefore, the generic formulas of the absolute time synchronization will be:

$$D_{Bl_n} = T'_{BtBr} - T'_{Bt}) \times (1 - K_{ppb}) \tag{20}$$

$$D\_(BrBt\_n) = ([T^{\wedge\prime}]\_Bt - [T^{\wedge\prime}]\_AtBr) \times (1 - K_{ppb}) \tag{21}$$

$$\frac{[D_{c_n} = (T]_{BtAr} - T_{At} - D_{Al} - D_{Bl_n} - B_{BrBt_n})}{2} \tag{22}$$

$$= \frac{[(T)_{BtAr} - T_{AtAr}) - [(T']_{BtBr} - T'_{AtBr}) \times (1 - K_{ppb})]}{2} \tag{23}$$

$$D_{BtAr_n} = D_{Al} + D_{c_n} \tag{24}$$

$$O_{AB_n} = T'_{Bt} - (T_{BtAr} - D_{BtAr}) \tag{25}$$

Where $K_{ppb}$ is the clock discrepancy measured by the first tool 20A with respect to the second tool 20B, and all the measurements with "n" subscripts are indications that they are normalized with respect to the first clock 72A reference.

As mentioned above, the timing signals (e.g., single tone synchronization timing burst signal) sent between tools may be a timing burst signal. In some instances, the single tone synchronization timing signal may have phase-banding issue, namely, the input single tone signal may correlate with its reference signal at the integer multiple of its signal period. This issue may occur when the signal phase is close to 180 degree or when there is more than a threshold amount of noise present in the input signal. To account for this phase banding issue, a highly correlated wideband signal, such as an encoded maximal length pseudo-random noise (PN) sequence, may be used as the synchronization timing signal in accordance with embodiments described herein. With this timing signal, the phase banding issue may be avoided when white or tone noise is present on the communication bus and/or when the communication bus channel frequency response is irregular. The wide band timing signal works may also be beneficial in flat communication bus channel response zones. However, this kind of wide band signal may be less accurate as compared with single tone timing signal when the communication bus channel is irregular.

With this in mind, in some embodiments, a wideband/single tone mix of the timing signal may be introduced to resolve the issues observed in single tone and wideband signals. By way of example, the mixing of these signals may include applying the wideband timing signal initially to lock in the right phase band and then apply the single tone signal for the following synchronizations for accuracy. In this way, the single tone timing signal's phase de-banding algorithm may be used to accurately determine the timing signal reception time after the phase band is known (e.g., obtained during wideband timing signal synchronizations).

Based on the calculations described above, the data acquisition system 40 or any suitable device may synchronize the operations of any particular device, such that the operations are in sync with different devices that operate using different clocks. Further, datasets received from different devices may be synchronized, such that analysis of the received datasets are performed accurately with limited risk of unsynchronized time measurements.

By way of example, any suitable device may perform the operations described herein to achieve the absolute time synchronization between devices, such as downhole tools. Indeed, components that benefit from these time synchronization operations include a tool that supports a system clock timer management system, a tool employing a timing signal transmission system, a tool that employs a timing signal reception system, a tool that supports the loopback timing signal reception, a communication bus that services as a synchronization media, and the like.

By performing the techniques described herein, devices may perform an absolute time inter-tool synchronization operation that includes a round-trip timing signal for transmission and reception of the timing signals. In some embodiments, the timing signal transmission time may be sent from one tool to another via inter-tool communication and may also be modulated inside the timing burst signal. The timing signal may be a single tone burst, other encoded wideband signal bursts, and the like.

In some embodiments, the wideband signal may be used to avoid the phase banding issue of the single tone signal. In some embodiments, the wideband signal may be mixed with single tone timing signals for balancing the accuracy and avoiding the phase banding. Alternatively, a statistical phase de-banding algorithm can be applied to avoid the clock discrepancy banding to make the timing signal phase measurement consistent.

Further, the clock discrepancy measurement may be achieved by comparing the elapsed time difference of two-timing synchronization timing signal bursts between the synchronizing tools, as discussed above. Moreover, the timing signal dispatch delay may be realized via the round-trip timing signal transmission/reception measurements between the synchronizing tools, as well the timing signal loopback measurements of each of the synchronizing tools. The timing signal loopback delay measurements may be used to quantify the internal hardware transmission/reception delays, which provides the compensation to the overall dispatch delay between synchronizing tools.

The clock discrepancy measurement can be used to normalize the synchronization timing signal dispatch delay measurement. Based on the clock discrepancy normalization of the timing signal dispatch delay, the timing signal dispatch delay may be more accurate.

The absolute time offset at the time of synchronization between the synchronizing tools can be obtained after the timing signal reception time and the timing signal dispatch delay are known. In addition, the time offset at any time between the synchronizing tools can be obtained after the time offset at synchronization and the clock discrepancy between them are known.

After performing the operations described above, the measured time offset at synchronization and clock discrepancy between the synchronizing tools can be used to perform the synchronization related timing corrections of the tool measurements such as resistivity phase correction.

The timing signal burst/reception can be triggered via inter-tool communication with communication bus authorization from the communication bus manager, or it can be done automatically by the synchronizing tools if multi-master communication bus is available. The timing signal burst/reception can be done in parallel with the communication bus communication. The timing signal burst/reception can be triggered via inter-tool communication with communication bus authorization from the communication bus manager, or it can be done automatically by the synchronizing tools if multi-master tool bus is available.

By performing the embodiments described herein, the present disclosure provides an improved method to achieve inter-tool synchronization. As illustrated above, each time a tool sends (e.g., fires) a timing signal burst, the same signal will be acquired and demodulated by itself (e.g., loopback measurement, $D_{Al}$) and by a second tool (e.g., D_AtBr) that may be synchronized with the first tool. In this way, the loopback measurement may be used to cancel variations in hardware signal transmission delay and receiving delay.

In addition, it should be understood in view of the embodiments described above that the inter-tool synchronization is realized via inter-tool communications and timing signal bursting. Indeed, the inter-tool communication serves to trigger the second tool involved in the synchronization to sample the timing burst signal (e.g., optional as the timing signal acquisition can be continuous). In addition, the inter-tool communication enables for information such as a timing signal burst time, demodulation results, and other intermediate synchronization measurements to be communicated between tools.

In some embodiments, inter-tool communication and timing signal bursts can be executed using the same communication bus (e.g., tool bus, media), separated with different communication buses (e.g., wired, wireless), and the like. In any case, the inter-tool sync measurements may include a clock discrepancy and a clock offset at timing signal bust time between the two clocks associated with the two respective tools. After these two measurements are known, either tool may determine a local time for any of its own local time measurements.

By performing the embodiments described herein, the inter-tool synchronization method may be executed dynamically in real time to accommodate or adjust to clock discrepancy changes due to environment (e.g., temperature) and the like. Moreover, instead of adjusting one clock to match another clock, the present embodiments use the inter-tool synchronization measurements to align the operations of the two tools, as well as to correct either tool's targeting measurements.

Although FIG. 3 illustrates a particular embodiment in which to perform the method 90, it should be understood that the messages sent between the two tools may be sent in any suitable order. That is, there are many options with regard to sending inter-tool communications/timing signal bursts when performing synchronizations among multiple tools and the embodiments described herein should not be limited to that presented in FIG. 3.

In some embodiments, each tool may include hardware components or structures to account for certain assumptions that may be part of the calculations describe above. For example, the assumptions may include that the loopback timing signal path is fully included in the normal timing signal transmission/reception path. In other words, there is no extra path other than the ones used for normal signal transmission/reception. Another assumption may include that the transmission delay difference between the synchronizing tools is small. Finally, a third assumption may include that the forward and backward channel delays are the same.

The first and second assumptions may be realized inside each tool. However, the third assumption may be carefully accounted for because there may be other tools on the communication bus, which may make the channel delay in different directions of the synchronizing tools asymmetric. To address this issue, the channel delay asymmetricity may be dynamically determined in real time or the channel delay asymmetricity may be avoided by the synchronization system design.

By way of example, in one embodiment, a symmetric timing signal channel delay circuit may be implemented into the embodiments described herein. That is, any suitable tools in the downhole assembly (whether it is involved in the synchronization or not) may have an option to block the timing signal (e.g., implement a band stop or a low pass filter, raise the tool bus inductance) while timing signal is being transmitted (e.g., as burst signal). In this embodiment, frequency components of the timing signal being used to synchronize the tools may be filtered or blocked at certain frequencies within a range of frequencies including the frequency of the timing signal. While the timing signal burst is ongoing, any non-sync-involved tools in the downhole assembly may in turn modify its respective circuit to block or filter the timing signal from being received. As such, the AC timing signal may be blocked or filtered, while maintaining the ability of the respective tool to receive the DC power. When timing signal burst is not present, any tool in the downhole assembly may modify its respective circuit again to switch back to a normal tool bus impedance operation.

Figure 5:
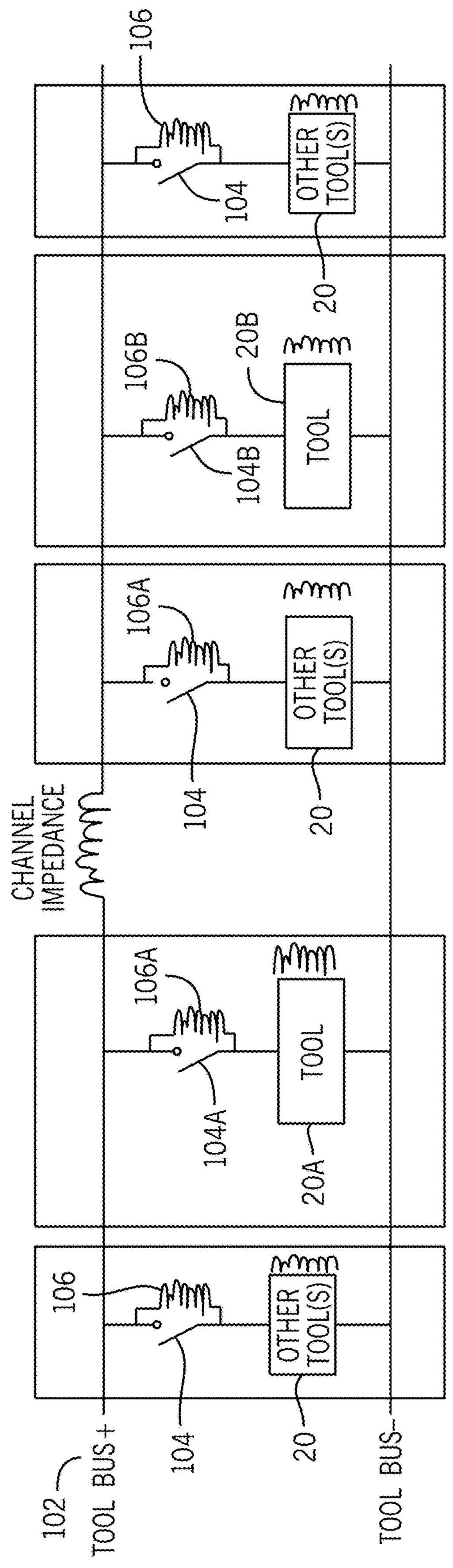
FIG. 5 is an example circuit diagram for filtering timing signals from being received by tools to account for asymmetric channel delays, in accordance with an embodiment of the present disclosure.

With this in mind, FIG. 5 illustrates an example embodiment for filtering the timing signal from being received. As shown in FIG. 5, the tool 20A and the tool 20B may be connected to other tools 20 via a tool bus 102. Each tool 20 may be connected (e.g., electrically) to a switch 104 and an inductor 106. The inductors 106 may be used to raise an inductance of the tool 20 to filter or block the timing signal from being received by the tool 20 when a synchronization process is being performed and when the respective tools 20 are not involved in the synchronization process. That is, the tools 20 that are not part of a synchronization operation may leave respective switches 104 open, thereby incorporating the inductor 106 in series with the tool 20. As a result, the timing signal provided the data acquisition system 40 or other suitable device as described above may be filtered or removed prior to being received by the tool 20. As such, the tools 20 in the downhole assembly may have an option to block the timing signal at a certain time.

Figure 6:
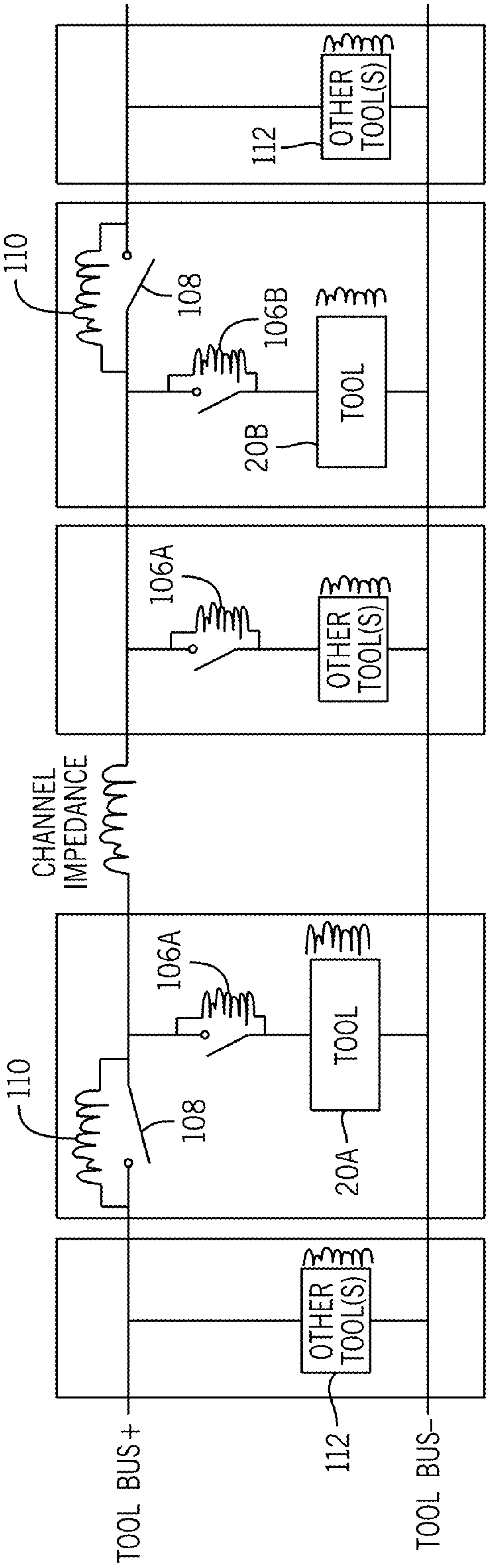
FIG. 6 is an additional example circuit diagram for filtering timing signals from being received by tools to account for asymmetric channel delays, in accordance with an embodiment of the present disclosure.

To minimize the number of circuit components (e.g., switches, inductors) that may be employed to filter the timing signal for various tools, FIG. 6 illustrates an alternate circuit embodiment for the synchronizing tools 20 to block the timing signal from entering the tools 20 when the respective tools 20 are not part of the synchronizing tools. As shown in FIG. 6, a switch 108 and an inductor 110 may be coupled in series with tools 20 that may be outside of the tools 20 expected to be synchronized. In this way, each tool 112 beyond the synchronizing tools 20 may not include additional circuitry (e.g., switches and inductors) to filter the timing signal. Indeed, the tools 112 may operate as desired without modifying any circuitry during synchronization operations. Indeed, the switches 108 may be closed during normal operations to allow various signals to reach the tools 112. However, if the timing signals for synchronization are being transmitted, the switches 108 may be opened (e.g., by control system) to filter or block the AC timing signal during synchronization operations.

Figure 7:
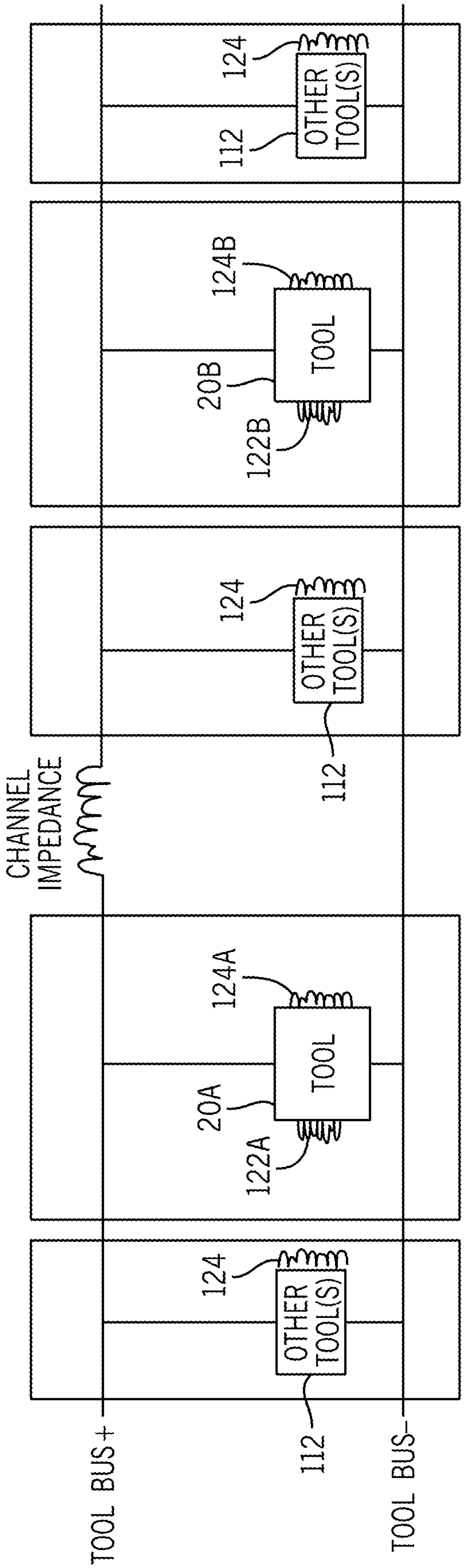
FIG. 7 is an additional example circuit diagram for filtering timing signals from being received by tools to account for asymmetric channel delays, in accordance with an embodiment of the present disclosure.

To completely avoid the blocking of the timing signal from non-sync-involved tools from blocking the AC timing signal, FIG. 7 illustrates another embodiment for implementing the symmetric channel delay design. Referring to FIG. 7, in some embodiments, the tools 20 that may be part of the synchronization operations may be capable of operating in two modes: (1) Normal mode: Normal tool bus communication mode; and (2) Synchronization mode: Low impedance (inductance) tool bus. The other tools 112 that are not expected to participate in the synchronization operations may only operate in the normal tool bus communication mode.

Referring first to the tools 112 that may not be part of the synchronization operations, these tools 112 may include an inductor 124 within its respective circuit that filters or blocks timing signals received from leader devices or tools. In the same manner, the tools 20 that may be part of the synchronization operations may also include the inductor 124. As such, the inductor 124 may be above a certain threshold inductance that may correspond to filtering or blocking timing signals from being received by the respective tool 20 or the respective tool 112.

With this in mind and referring to the tools 20 of FIG. 7, these tools 20 may include an additional inductor 122A or 122B that may be placed in parallel with the respective inductor 124A, 124B when operating in a synchronization mode. That is, to operate in the synchronization mode, the tool 20 may add the inductance of the inductor 122A or 122B within its own circuitry via a switch, switching device (e.g., diode, thyristor), or the like, such that the inductor 122A or 122B may be electrically coupled to the respective inductor 124A, 122B in parallel. By adding a parallel connection between the inductor 122A or 122B and the respective inductor 124A, 124B the tool 20 may effectively reduce the total inductance of the receiving channel, such that it becomes less than the threshold associated with the respective inductor 124A, 124B. As a result, timing signals may no longer be filtered or blocked from being received by the tool 20.

With this in mind, when a synchronization process is ongoing, the tools 20 may switch from normal mode to synchronization mode by adding the inductor 122A or 122B in parallel with the respective inductor 124A, 124B using any suitable method, system, or technique. However, the other tools 112 may only include the inductor, thereby continuously blocking timing signals from being received. In this way, there are no adaptations involved for the non-sync-involved tools (tools 112) and instead, they may operate in just one mode, thereby simplifying the respective circuitry, minimizing the circuit components of the circuitry, and limiting manner in which the tools 112 may operate.

Keeping the foregoing in mind, the delay time associated with signals being transmitted and received may not be synchronous in both directions. That is, the time delay associated with a timing burst signal being transmitted via the tool 20A and being received via the tool 20B, and vice versa, may not be synchronous. Indeed, as mentioned above, the method 90 may assume that the transmission delay difference between the synchronizing tools is small and that the forward and backward channel delays are the same.

To account for these assumptions, the data acquisition system 40 may measure cross components at the two tools 20A and 20B to determine the transmission and reception synchronization delays. In some embodiments, the measured cross components may include a current measurement at the tool 20 that receives the timing burst signal and a voltage measurement at the tool that sends the timing burst signal. It should be noted that the measured cross components may also include a voltage measurement at the tool 20 that receives the timing burst signal and a current measurement at the tool that sends the timing burst signal. In any case, by comparing the measured cross component signals at each respective tool 20 with knowledge of the times that the timing burst signals (or any suitable timing signal) are transmitted and received at each respective tool 20, the data acquisition system 40 may determine the transmission and reception synchronization delays associated with the two tools 20. As a result, the data acquisition system 40 may apply the determined transmission and reception synchronization delays to the absolute time inter-tool synchronization operation described above with reference to FIGS. 3 and 4 to account for the asynchronous properties of each tool 20.

To determine the asynchronous properties between two tools 20, the data acquisition system 40 may initiate a channel delay symmetry process between the tools 20A and 20B to account for the asynchronous symmetry in communication between both tools 20. For example, by way of operation, after receiving a request to perform the channel delay symmetry process, the first tool 20A may send a synchronization signal to the second tool 20B. The synchronization signal may indicate to the second tool 20B that the first tool 20A will send a timing signal (e.g., timing burst) at a particular time $t_1$, as measured by the first clock 72A with a current sensor or measurement device. As such, the second tool 20B may expect to receive the timing signal at some time $t_2$ (after time $t_1$), as measured by the second clock 72B with a voltage measurement device. In response to receiving the timing signal at time $t_2$, the second tool 20B may send a response signal back to the first tool 20A at time $t_3$. The time $t_3$ may correspond to an expected amount of time or delay after the second tool 20B receives the timing signal at time $t_2$, a time specified by the second tool 20B in a separate message to the first tool 20A, or the like. When the second tool 20B receives the timing signal at time $t_2$, the second tool 20B may measure a cross component or a voltage signal that corresponds to the received timing signal. That is, since the first tool 20A measured the current signal that corresponds to the transmitted timing signal, the second tool 20B may measure the voltage signal that corresponds to the received timing signal. In this way, the first tool 20A may use the measured current signal as a time reference and a phase reference, while the second tool 20B may use the measured voltage signal as its time reference and phase reference.

In the same manner, the second tool 20B may send another timing signal at time $t_4$ to the first tool 20A and measure the additional timing signal with the voltage measurement device. In turn, the first tool 20A may receive the additional timing signal at time $t_5$ and measure the received signal with the current sensor. The data acquisition system 40 or either tool 20A or 20B may use the measurements acquired by both tools to measure the asynchronous delays due to the communication between the two tools 20A and 20B. Although the technique described above is discussed with the tool 20A having the current sensor and the tool 20B having the voltage measurement device, it should be noted that the embodiments described herein may also be performed with the tool 20B having the current sensor and the tool 20A having the voltage measurement device.

With this in mind, since the first tool 20A and the second tool 20B make up a two-port network, the network has certain impedance parameters that may be present in the communication channel between the two tools 20. Indeed, the impedance parameters looking into an asymmetric network from each tool 20 is not the same. However, so long as the tools 20A and 20B include passive linear components, the electromagnetic properties between the two tools 20 remain the same. By taking the current signal measured at the first tool 20A and a demodulated signal obtained from the voltage signal measured at the second tool 20B, the data acquisition system 40 may determine the asynchronous delay between the two tools 20A and 20B. The determined asynchronous delay may then be applied to synchronization process described above with respect to FIGS. 3 and 4. That is, the data acquisition system 40 may synchronize the datasets and time data received from the tools 20 by determining the channel delay between the two communications and by accounting for the asynchronous delays between the two tools 20.

As such, by employing the techniques described herein, the data acquisition system 40 may ensure that the tools 20 are in sync with each other to perform various operations. That is, the data acquisition system 40 may synchronize the datasets received from each tool 20 to determine operational adjustments (e.g., increase speed, adjust frequency) for the tools 20. In some embodiments, the tool control circuitry 62 may perform the embodiments described herein to synchronize its operations with another tool in the drill string 12.

The subject matter described in detail above may be defined by one or more clauses, as set forth below.

A system, comprising: a first tool comprising first control circuitry, wherein the first tool is configured to perform a first operation within a borehole; and a second tool comprising second control circuitry, wherein the second tool is configured to perform a second operation within the borehole, and wherein the first control circuitry is configured to: send a first message to the second control circuitry, wherein the first message comprises a first time associated with a transmission of a second message from the first control circuitry to the second control circuitry; send the second message to the second control circuitry at the first time; determine a second time associated with a reception of a loop-back message associated with the second message; determine a first loop-back timing delay based on the first time and the second time; receive a third message from the second control circuitry, wherein the third message comprises a third time associated with a transmission of a fourth message from the second control circuitry to the first control circuitry; determine a fourth time associated with a reception of the fourth message, wherein the fourth message comprises a fifth time associated with a transmission of the third message; receive a second loop-back timing delay associated with the second control circuitry from the second control circuitry; and determine an absolute time synchronization delay between the first control circuitry and the second control circuitry based on the first time, the second time, the third time, the fourth time, the fifth time, the first loop-back timing delay, and the second loop-back timing delay.

The system of the preceding clause, comprising a computing device configured to communicatively couple to the first control circuitry, wherein the computing device is configured send the first control circuitry an initialization message configured to cause the first control circuitry to send the first message to the second control circuitry.

The system of any preceding clause, wherein the first control circuitry is configure to determine a sixth time to activate an analog-to-digital converter (ADC) device to sample a loop-back timing signal.

The system of any preceding clause, wherein the second message comprises a timing burst signal.

The system of any preceding clause, wherein the second control circuitry is configured to sample the second message via an analog-to-digital converter (ADC) device.

The system of any preceding clause, wherein the first control circuitry is communicatively coupled to the second control circuitry via a communication bus.

The system of any preceding clause, wherein the first control circuitry and the second control circuitry are associated with a first clock and a second clock, respectively.

The system of any preceding clause, wherein the first control circuitry is configured to synchronize with the second clock based on the absolute time synchronization delay.

A tangible, non-transitory, computer-readable medium comprising instructions that, when executed by processing circuitry, are configured to cause the processing circuitry to: send a first message to an additional processing circuitry, wherein the first message comprises a first time associated with a transmission of a second message from the first processing circuitry to the additional processing circuitry; send the second message to the additional processing circuitry at the first time; determine a second time associated with a reception of a loop-back message associated with the second message; determine a first loop-back timing delay based on the first time and the second time; receive a third message from the second control circuitry, wherein the third message comprises a third time associated with a transmission of a fourth message from the additional processing circuitry to the processing circuitry; determine a fourth time associated with a reception of the fourth message, wherein the fourth message comprises a fifth time associated with a transmission of the third message; receive a second loop-back timing delay associated with the additional processing circuitry from the additional processing circuitry; and determine an absolute time synchronization delay between the processing circuitry and the additional processing circuitry based on the first time, the second time, the third time, the fourth time, the fifth time, the first loop-back timing delay, and the second loop-back timing delay.

The tangible, non-transitory, computer-readable medium of the preceding clause, wherein the processing circuitry is configured to receive an initialization message configured to cause the processing circuitry to send the first message to the additional processing circuitry.

The tangible, non-transitory, computer-readable medium of any preceding clause, wherein the processing circuitry is configured to determine a second time to activate an analog-to-digital converter (ADC) device to sample a loop-back timing signal.

The tangible, non-transitory, computer-readable medium of any preceding clause, wherein the second message comprises a timing burst signal.

The tangible, non-transitory, computer-readable medium of any preceding clause, wherein the additional processing circuitry is configured to sample the second message via an analog-to-digital converter (ADC) device.

The tangible, non-transitory, computer-readable medium of any preceding clause, wherein the first control circuitry is communicatively coupled to the additional processing circuitry via a communication bus.

The tangible, non-transitory, computer-readable medium of any preceding clause, wherein the processing circuitry and the additional processing circuitry are associated with a first clock and a second clock, respectively.

The tangible, non-transitory, computer-readable medium of any preceding clause, wherein the processing circuitry is configured to synchronize with the second clock based on the absolute time synchronization delay.

A method, comprising: sending, via processing circuitry, a first message to an additional processing circuitry, wherein the first message comprises a first time associated with a transmission of a second message from the first processing circuitry to the additional processing circuitry; sending, via the processing circuitry, the second message to the additional processing circuitry at the first time; determining, via the processing circuitry, a second time associated with a reception of a loop-back message associated with the second message; determining, via the processing circuitry, a first loop-back timing delay based on the first time and the second time; receiving, via the processing circuitry, a third message from the second control circuitry, wherein the third message comprises a third time associated with a transmission of a fourth message from the additional processing circuitry to the processing circuitry; determining, via the processing circuitry, a fourth time associated with a reception of the fourth message, wherein the fourth message comprises a fifth time associated with a transmission of the third message; receiving, via the processing circuitry, a second loop-back timing delay associated with the additional processing circuitry from the additional processing circuitry; and determining, via the processing circuitry, an absolute time synchronization delay between the processing circuitry and the additional processing circuitry based on the first time, the second time, the third time, the fourth time, the fifth time, the first loop-back timing delay, and the second loop-back timing delay.

The method of the preceding clause, comprising receiving an initialization message configured to cause the processing circuitry to send the first message to the additional processing circuitry.

The method of any preceding clause, comprising determining a second time to activate an analog-to-digital converter (ADC) device to sample a loop-back timing signal.

The method of any preceding clause, wherein the second message comprises a timing burst signal.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principles of the disclosure and its practical applications, to thereby enable others skilled in the art to best utilize the disclosure and various embodiments with various modifications as are suited to the particular use contemplated.

Finally, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
- a first tool comprising first control circuitry, wherein the first tool is configured to perform a first operation within a borehole; and
- a second tool comprising second control circuitry, wherein the second tool is configured to perform a second operation within the borehole, and wherein the first control circuitry is configured to:
  - send a first message to the second control circuitry, wherein the first message comprises a first time associated with a transmission of a second message from the first control circuitry to the second control circuitry;
  - send the second message to the second control circuitry at the first time;
  - determine a second time associated with a reception of a loop-back message associated with the second message;
  - determine a first loop-back timing delay based on the first time and the second time;
  - receive a third message from the second control circuitry, wherein the third message comprises a third time associated with a transmission of a fourth message from the second control circuitry to the first control circuitry;
  - determine a fourth time associated with a reception of the fourth message, wherein the fourth message comprises a fifth time associated with a transmission of the third message;
  - receive a second loop-back timing delay associated with the second control circuitry from the second control circuitry; and
  - determine an absolute time synchronization delay between the first control circuitry and the second control circuitry based on the first time, the second time, the third time, the fourth time, the fifth time, the first loop-back timing delay, and the second loop-back timing delay.

2. The system of claim 1, comprising a computing device configured to communicatively couple to the first control circuitry, wherein the computing device is configured send the first control circuitry an initialization message configured to cause the first control circuitry to send the first message to the second control circuitry.

3. The system of claim 1, wherein the first control circuitry is configured to determine a sixth time to activate an analog-to-digital converter (ADC) device to sample a loop-back timing signal.

4. The system of claim 1, wherein the second message comprises a timing burst signal.

5. The system of claim 1, wherein the second control circuitry is configured to sample the second message via an analog-to-digital converter (ADC) device.

6. The system of claim 1, wherein the first control circuitry is communicatively coupled to the second control circuitry via a communication bus.

7. The system of claim 1, wherein the first control circuitry and the second control circuitry are associated with a first clock and a second clock, respectively.

8. The system of claim 7, wherein the first control circuitry is configured to synchronize with the second clock based on the absolute time synchronization delay.

9. A tangible, non-transitory, computer-readable medium comprising instructions that, when executed by processing circuitry, are configured to cause the processing circuitry to:
- send a first message to an additional processing circuitry, wherein the first message comprises a first time associated with a transmission of a second message from the processing circuitry to the additional processing circuitry;
- send the second message to the additional processing circuitry at the first time;
- determine a second time associated with a reception of a loop-back message associated with the second message;
- determine a first loop-back timing delay based on the first time and the second time;
- receive a third message from the additional processing circuitry, wherein the third message comprises a third time associated with a transmission of a fourth message from the additional processing circuitry to the processing circuitry;

determine a fourth time associated with a reception of the fourth message, wherein the fourth message comprises a fifth time associated with a transmission of the third message;

receive a second loop-back timing delay associated with the additional processing circuitry from the additional processing circuitry; and determine an absolute time synchronization delay between the processing circuitry and the additional processing circuitry based on the first time, the second time, the third time, the fourth time, the fifth time, the first loop-back timing delay, and the second loop-back timing delay.

10. The tangible, non-transitory, computer-readable medium of claim 9, wherein the processing circuitry is configured to receive an initialization message configured to cause the processing circuitry to send the first message to the additional processing circuitry.

11. The tangible, non-transitory, computer-readable medium of claim 9, wherein the processing circuitry is configured to determine a second time to activate an analog-to-digital converter (ADC) device to sample a loop-back timing signal.

12. The tangible, non-transitory, computer-readable medium of claim 9, wherein the second message comprises a timing burst signal.

13. The tangible, non-transitory, computer-readable medium of claim 9, wherein the additional processing circuitry is configured to sample the second message via an analog-to-digital converter (ADC) device.

14. The tangible, non-transitory, computer-readable medium of claim 9, wherein the processing circuitry is communicatively coupled to the additional processing circuitry via a communication bus.

15. The tangible, non-transitory, computer-readable medium of claim 9, wherein the processing circuitry and the additional processing circuitry are associated with a first clock and a second clock, respectively.

16. The tangible, non-transitory, computer-readable medium of claim 15, wherein the processing circuitry is configured to synchronize with the second clock based on the absolute time synchronization delay.

17. A method, comprising:

sending, via processing circuitry, a first message to an additional processing circuitry, wherein the first message comprises a first time associated with a transmission of a second message from the processing circuitry to the additional processing circuitry;

sending, via the processing circuitry, the second message to the additional processing circuitry at the first time;

determining, via the processing circuitry, a second time associated with a reception of a loop-back message associated with the second message;

determining, via the processing circuitry, a first loop-back timing delay based on the first time and the second time;

receiving, via the processing circuitry, a third message from the additional processing circuitry, wherein the third message comprises a third time associated with a transmission of a fourth message from the additional processing circuitry to the processing circuitry;

determining, via the processing circuitry, a fourth time associated with a reception of the fourth message, wherein the fourth message comprises a fifth time associated with a transmission of the third message;

receiving, via the processing circuitry, a second loop-back timing delay associated with the additional processing circuitry from the additional processing circuitry; and determining, via the processing circuitry, an absolute time synchronization delay between the processing circuitry and the additional processing circuitry based on the first time, the second time, the third time, the fourth time, the fifth time, the first loop-back timing delay, and the second loop-back timing delay.

18. The method of claim 17, comprising receiving an initialization message configured to cause the processing circuitry to send the first message to the additional processing circuitry.

19. The method of claim 18, comprising determining a sixth time to activate an analog-to-digital converter (ADC) device to sample a loop-back timing signal.

20. The method of claim 19, wherein the second message comprises a timing burst signal.

* * * * *